E. HICKEY.
DETACHABLE HANDLE FOR PANS.
APPLICATION FILED OCT. 29, 1907.
906,801.
Patented Dec. 15, 1908.
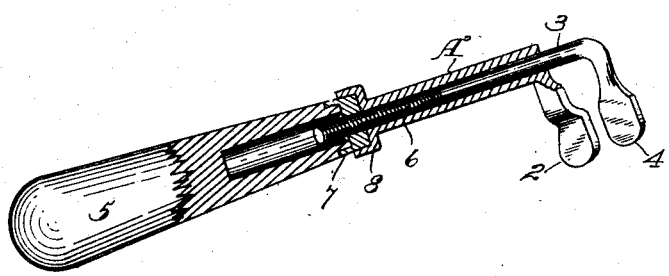
Witnesses:
Inventor:
Edward Hickey
By Geo. H. Strong.
Atty.

UNITED STATES PATENT OFFICE.

EDWARD HICKEY, OF SAWYERS BAR, CALIFORNIA.

DETACHABLE HANDLE FOR PANS.

No. 906,801.           Specification of Letters Patent.           Patented Dec. 15, 1908.

Application filed October 29, 1907. Serial No. 399,721.

*To all whom it may concern:*

Be it known that I, EDWARD HICKEY, citizen of the United States, residing at Sawyers Bar, in the county of Siskiyou and State of California, have invented new and useful Improvements in Detachable Handles for Pans, of which the following is a specification.

My invention relates to a handle for pans, stew-pots, and culinary or other vessels.

It consists in the combination of parts and in details of construction which will be more fully explained by reference to the accompanying drawings, in which—the figure is a perspective view of the device.

It is the object of my invention to provide a handle having clamps suitably disposed so that the handle may be readily affixed to any pan or utensil for the purpose of lifting or carrying the same, and may be detached and removed whenever desirable.

The device may be a two-part one, one portion being threaded with relation to the other, and the handle turnable so as to draw the jaws together, or separate them.

As shown in the drawing, A is a portion of the shank having a downwardly extending gripping jaw 2.

3 is a second shank; this also having a downwardly projecting jaw 4.

The part A may be channeled or hollow to receive the part 3, or so that the two parts may be slidable with relation to each other. One of the parts may be secured to a handle 5, and the other part removable with relation to the handle. Thus the part A may be secured to the handle 5, the part 3 slidable with relation to the part A, may have its inner end screw-threaded as shown at 6, and this end will be turnable in corresponding screw-threads in a nut 7, which is carried by the handle 5, so that by turning the handle with relation to the part A and its coupling 8, the part 3 will be caused to move out or in as required.

The jaw 2 of the part A is projected slightly so that after being passed over the rim 9 of the pan 10, the handle being turned, will draw the jaws 2 and 4 together, and these jaws will grip the sides of the pan just below the rim; thus forming a firm handle by which the pan or utensil may be moved as required, which is especially useful where the utensils are hot.

By turning the handles in the opposite direction, the threaded portion of the shank will be moved outwardly, and with it the jaw which is connected therewith, thus releasing the grip and allowing the handle to be removed from the utensil.

Having thus described my invention, what I claim and desire to secure by Letters Patent is—

1. As an article of manufacture, a detachable handle for pans, said handle consisting of a shank portion having a downwardly extending gripping jaw at one end and having a handle at the opposite end, said handle being provided with a nut; and a companion shank portion slidably fitting within the first-named shank portion and having a downwardly projecting jaw at one end and having threads to be engaged by said nut, the jaws of the two shank portions being widened transversely to form broad bearing surfaces adapted to grip a pan.

2. As an article of manufacture, a detachable handle for pans, said handle consisting of a shank portion having a downwardly extending gripping jaw at one end and having a coupling member at the opposite end; a companion shank portion slidably fitting within the first-named shank portion and having a downwardly projecting jaw; and a handle having a nut to engage threads on said second named shank portion, said jaws being widened transversely to form broad bearing surfaces adapted to grip a pan, and the faces of said jaws being substantially parallel for a portion of the length of the jaws and having the remaining portions offset to accommodate the rim of a pan.

In testimony whereof I have hereunto set my hand in presence of two subscribing witnesses.

EDWARD HICKEY.

Witnesses:
     JAMES R. HUGHES,
     WM. M. WIKE.